(12) United States Patent
Marvin et al.

(10) Patent No.: US 6,500,580 B1
(45) Date of Patent: Dec. 31, 2002

(54) FUEL CELL FLUID FLOW PLATE FOR PROMOTING FLUID SERVICE

(75) Inventors: Russel H. Marvin, Goshen, CT (US); Charles M. Carlstrom, Jr., Saratoga Springs, NY (US)

(73) Assignee: Plug Power Inc., Latham, NY (US)

( * ) Notice: Subject to any disclaimer, the term of this patent is extended or adjusted under 35 U.S.C. 154(b) by 134 days.

(21) Appl. No.: 09/608,889

(22) Filed: Jun. 30, 2000

Related U.S. Application Data

(63) Continuation-in-part of application No. 09/167,359, filed on Oct. 7, 1998, now Pat. No. 6,174,616.

(51) Int. Cl.[7] .................................................. H01M 2/14
(52) U.S. Cl. .............................. 429/39; 429/38; 429/34; 429/13
(58) Field of Search .............................. 429/39, 38, 35, 429/36, 34, 13

(56) References Cited

U.S. PATENT DOCUMENTS 6,017,648 A * 1/2000 Jones ........................... 429/35

* cited by examiner

*Primary Examiner*—Patrick Ryan
*Assistant Examiner*—R Alejandro
(74) *Attorney, Agent, or Firm*—Heslin Rothenberg Farley & Mesiti P.C.

(57) ABSTRACT

A fluid flow plate for a fuel cell includes a first face and a fluid manifold opening for receiving a fluid and at least one flow channel defined within the first face for distributing a reactant in the fuel cell. A dive through hole is defined in and extends through the fluid flow plate. The dive through hole is fluidly connected to the fluid manifold opening by an inlet channel, defined within an opposite face of the plate. The dive through hole and the inlet channel facilitate transmission of a portion of the fluid to the flow channel. A groove, adapted to receive a sealing member, is also defined within the first face and/or the opposite face. The sealing member may comprise a gasket which seals the respective fluid manifolds, thereby preventing leaking of fluid.

9 Claims, 4 Drawing Sheets

FUEL CELL FLUID FLOW PLATE FOR PROMOTING FLUID SERVICE

CROSS REFERENCE TO RELATED APPLICATIONS

This is a continuation-in-part of U.S. application Ser. No. 09/167,359 filed Oct. 7, 1998 now U.S. Pat. No. 6,174,616 the entire disclosure of which is hereby incorporated by reference.

TECHNICAL FIELD

This invention relates generally to fuel cells and, more particularly, to fluid flow plates configured for promoting fluid service and design flexibility.

BACKGROUND

Fuel cells electrochemically convert fuels and oxidants to electricity. A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant fluids (e.g., hydrogen and air/oxygen gases). The direction, from anode to cathode, of flow of protons serves as the basis for labeling an "anode" side and a "cathode" side of every layer in the fuel cell, and in the fuel cell assembly or stack.

In general, an individual PEM-type fuel cell may have multiple, generally transversely extending layers assembled in a longitudinal direction. In a typical fuel cell assembly or stack, all layers which extend to the periphery of the fuel cells have holes therethrough for alignment and formation of fluid manifolds that generally service fluids for the stack. Typically, gaskets seal these holes and cooperate with the longitudinal extents of the layers for completion of the fluid supply manifolds. As may be known in the art, some of the fluid supply manifolds distribute fuel (e.g., hydrogen) and oxidant (e.g., air/oxygen) to, and remove unused fuel and oxidant as well as product water from, fluid flow plates which serve as flow field plates of each fuel cell. Other fluid supply manifolds circulate coolant (e.g., water) for cooling the fuel cell.

In a typical PEM-type fuel cell, the membrane electrode assembly (hereinafter "MEA") is sandwiched between "anode" and "cathode" gas diffusion layers (hereinafter "GDLs") that can be formed from a resilient and conductive material such as carbon fabric or paper. The anode and cathode GDLs serve as electrochemical conductors between catalyzed sites of the PEM and the fuel (e.g., hydrogen) and oxidant (e.g., air/oxygen) which flow in respective "anode" and "cathode" flow channels of respective flow field plates.

Typically, the distribution of reactant gases to the various fluid flow plates in the fuel cell stack, as well as removal of unused reactant gases and water from the plates, is accomplished by the fluid flow manifolds. Each of the various components in the stack has a "manifold hole" which, when aligned, form columns that are used as fluid flow manifolds. The fluid flow manifolds conduct their respective fluids substantially perpendicular to the planes of the various fluid flow plates. If a particular plate distributes the fluid that is being conducted through a particular fluid manifold, that manifold must be in communication with that plate's flow channels.

Accordingly, it is desirable to provide a fluid flow plate which allows fluids to pass from the fluid manifolds directly to the flow channels while providing an adequate seal to prevent leakage of fluids.

SUMMARY OF THE INVENTION

The invention provides a fluid flow plate for a fuel cell. The fluid flow plate includes a first face and a fluid manifold opening for receiving a fluid and at least one flow channel defined within the first face for distributing a reactant in the fuel cell. A dive through hole is defined in and extends through the fluid flow plate. The dive through hole is fluidly connected to the fluid manifold opening by an inlet channel, defined within an opposite face of the fluid flow plate. The dive through hole and the inlet channel facilitate transmission of a portion of the fluid to the flow channel. A groove, adapted to receive a sealing member, is also defined within the first face and/or the opposite face. The sealing member may comprise a gasket which seals respective fluid manifolds, thereby preventing leaking of fluid.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

DETAILED DESCRIPTION

In accordance with the principles of the present invention, a fuel cell is provided with a novel fluid flow plate which utilizes dive through holes fluidly connecting fluid flow manifolds with their respective flow channels. The fluid flow plate has a plurality of fluid flow manifolds, and a plurality of active area flow channels located on each face or side of the fluid flow plate. The active area flow channels on a first side of the fluid flow plate, are connected to fluid flow manifolds, by use of dive through holes, and inlet channels on an opposite side of the fluid flow plate. Similarly, flow channels, may be located on the opposite side of the fluid flow plate, are connected to fluid flow manifolds by the use of dive through holes and inlet channels located on the first side of the fluid flow plate. The dive through holes extend through the fluid flow plate thereby allowing fluid from the fluid flow manifolds to enter the flow channels. The use of dive through holes, creates a smooth surface on the fluid face plate, at which point a groove is located, thereby allowing a gasket to be placed in the groove, to seal the respective fluid manifolds, thereby preventing leaking of fluid.

Figure 1:
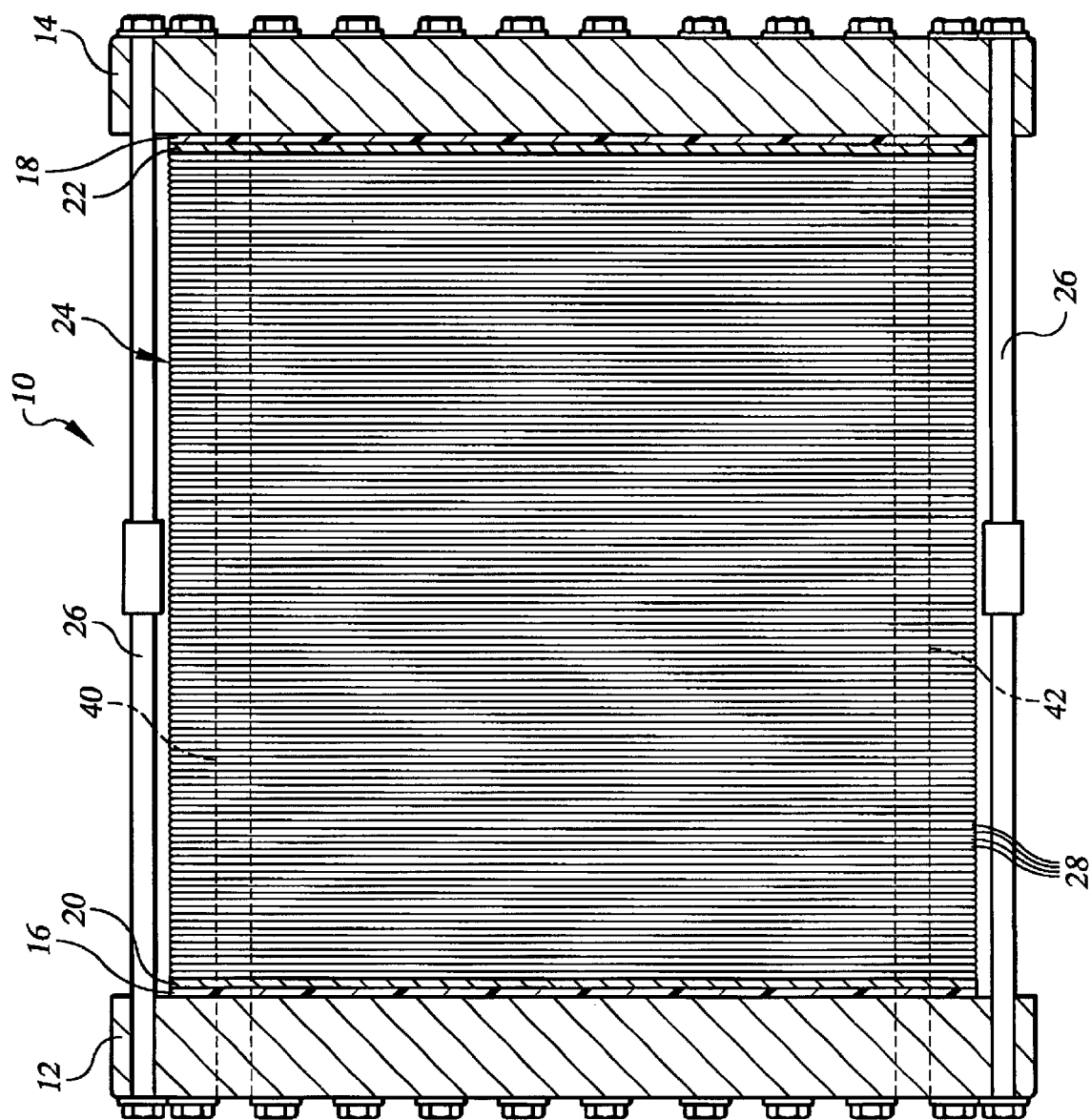
FIG. 1 is a front elevation view of one example of a fuel cell assembly incorporating and using fluid flow plates in accordance with the present invention.

An example of a fuel cell assembly incorporating novel features of the present invention is depicted in FIG. 1. In this exemplary embodiment, a fuel cell stack 10 includes end plates 12 and 14, insulation layers 16 and 18, and current collector/conductor plates 20 and 22, with a working section 24 therebetween. The working section includes one or more active sections and can include a selected number of cooling sections, as will be understood by those skilled in the art. In one aspect of the present invention, the one or more active sections can further serve to perform cooling for the fuel cell assembly. A number of structural members 26 can be employed to join end plate 12 to end plate 14.

Working section 24 includes a number of layers 28. The layers generally form fluid manifolds for supplying reactant gas or fluids to, removing fluids from, and otherwise communicating and/or servicing fluids as desired within working section 24, as will be appreciated by those skilled in the art. The layers of fuel cell stack 10 might have applied thereto compressive forces.

A plurality of layers 28 may form one or more PEM-type fuel cells. The construction and utilization of PEM fuel cells is known in the art. By connecting an external load (not shown) between electrical contacts (not shown) of current collector/conductor plates 20 and 22, one can complete a circuit for use of current generated by the one or more PEM-type fuel cells.

Figure 2:
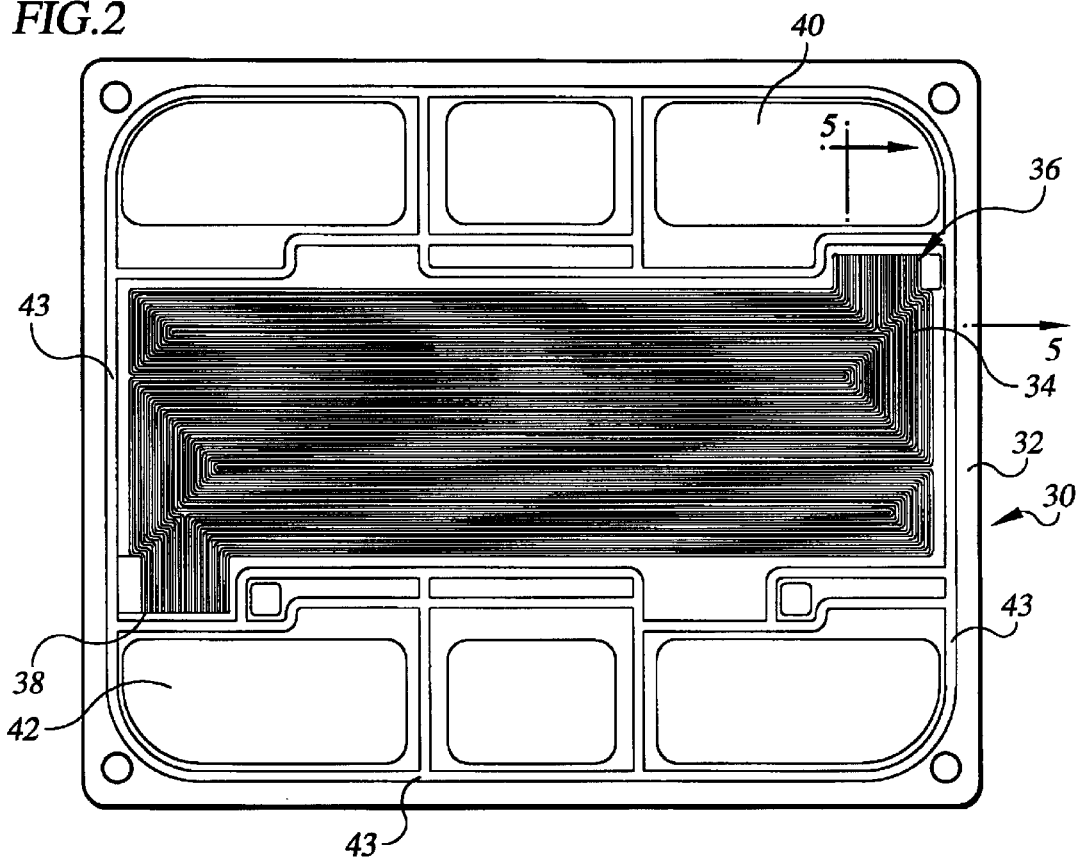
FIG. 2 is a side elevation view of one example of a fluid flow plate incorporating and using inlet channels and a gasket groove in accordance with the present invention.
Figure 3:
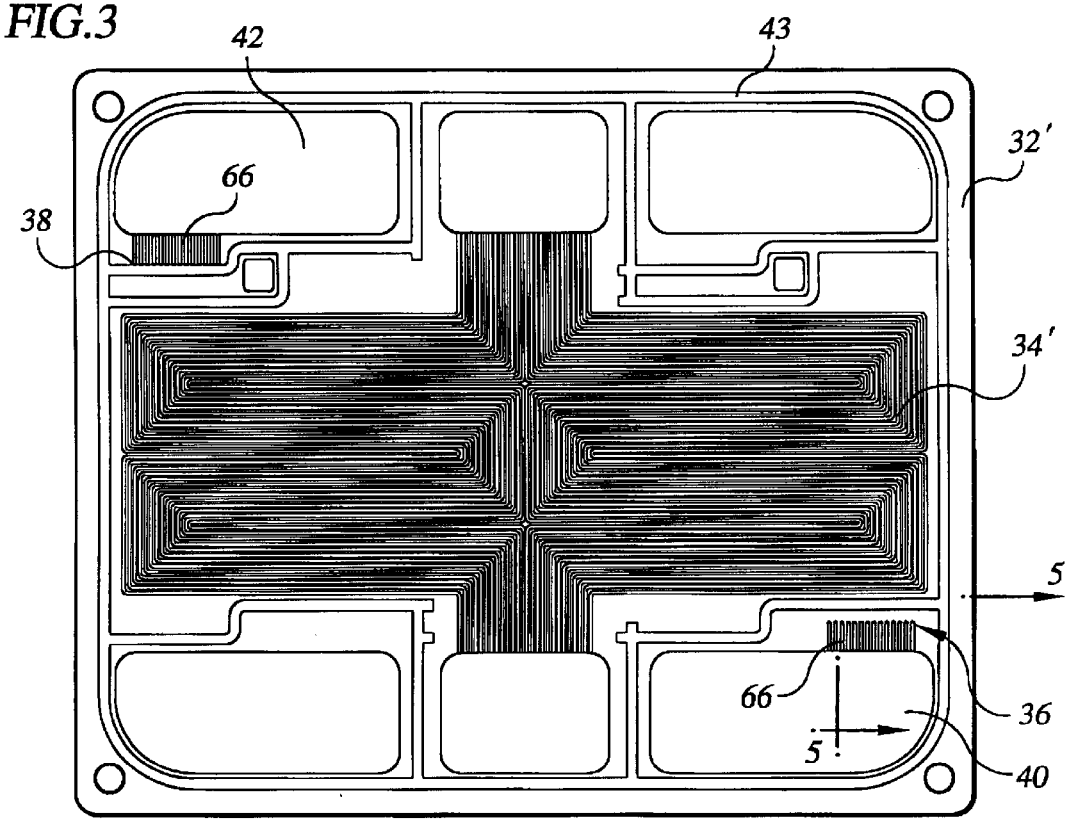
FIG. 3 is a side elevation view of the opposite side of the fluid flow plate of FIG. 2.

One example of a fuel cell plate, which forms, layer 28 of working section 24 is depicted in FIGS. 2 and 3 as a fluid flow plate 30. FIG. 3 is an exemplary illustration of the opposite side of the fluid flow plate depicted in FIG. 2. Fluid flow plate 30 has a fluid flow face 32 with at least one generally serpentine flow channel 34. Flow channel 34 receives and transmits one or more fluids through an inlet 36 and out an outlet 38 which are in fluid communication with corresponding fluid entry manifold 40 and fluid exit manifold 42. On the opposite side 32' of fluid flow plate 30 is located at least one generally serpentine flow channel 34'.

While multiple serpentine flow channels are illustrated in FIGS. 2 and 3, it will be appreciated by those skilled in the art that the various embodiments of the fluid flow plates according to the present invention may include a plurality of continuous flow channels, e.g., a fluid flow plate having four quadrants, each with portions of a flow channel and/or separate flow channels, or a single flow channel having multiple sections.

Inlet 36 and outlet 38 may each comprise a dive through hole which extends through the thickness of fluid flow plate 30, e.g., transversely or on an angle, and which opens onto inlet and/or outlet channels, on the opposite side of the fluid flow plate. The dive through holes at inlet 36 and outlet 38 fluidly connect to open onto entry fluid manifold 40 and exit manifold 42, respectively. A similar configuration of inlet and outlet channels may be located on the opposite side of fluid flow plate 30. Such a configuration and other equally suitable configurations as may be known in the art may be used for fluidly connecting the fluid manifolds to the flow channel. A given fluid flow plate may be formed from a conductive material such as graphite or any other suitable material as may be known in the art. As is known in the art, fluid flow plates may be bipolar, monopolar, or combined monopolar (e.g., anode cooler or cathode cooler).

Flow field plates may be commonly produced by any of a variety of processes. One plate construction technique, which may be referred to as "monolithic" style, compresses carbon powder into a coherent mass. Next, the coherent mass is subjected to high temperature processes which bind the carbon particles together, and convert a portion of the mass into graphite for improved electrical conductivity. Then, the mass is cut into slices, which are formed into the flow field plates. Each flow field plate may be subjected to a sealing process (e.g., resin impregnation) in order to decrease gas permeation therethrough and reduce the risk of uncontrolled reactions. Flow field channels may be engraved or milled into a face of the rigid, resin impregnated graphite plate. Alternatively, the fluid flow plate may be injected molded with the flow channel formed on a surface of the plate.

In one example, fluid flow plate 30 serves as a flow field plate and flow channel 34 conducts fluid which includes reactant gas for fuel cell assembly 10. The reactant gas serves as fuel or oxidant for a given fuel cell. For instance, the flow channel can carry reactant gas (e.g., a fuel such as hydrogen or an oxidant such as air/oxygen) as well as a liquid (e.g., humidification and/or product water), as will be understood by those skilled in the art. In the context of this invention a reactant gas may be any substance which is classified as a fuel, such as substantially pure hydrogen, methanol reformate or natural gas reformate, or any substance classified as an oxidant such as substantially pure oxygen or oxygen containing air, as may be known in the art.

A sealing member, e.g. gasketing material or gaskets may be employed within gasket groove 43, to seal and cooperate with the longitudinal extents of layers 28 in formation of the fluid supply manifolds. A given gasket might take the form of, for instance, a frame gasket made from a polytetrafluoroethylene ("PTFE") material manufactured by E. I. Du Pont de Nemours Company and sold under the trademark TEFLON®. Gasket groove 43 defines a sufficient volume in flow field plate 30 to house a gasket and/or gasketing material to seal and cooperate with the longitudinal extents of layers 28 in formation of the fluid supply manifolds.

Figure 4:
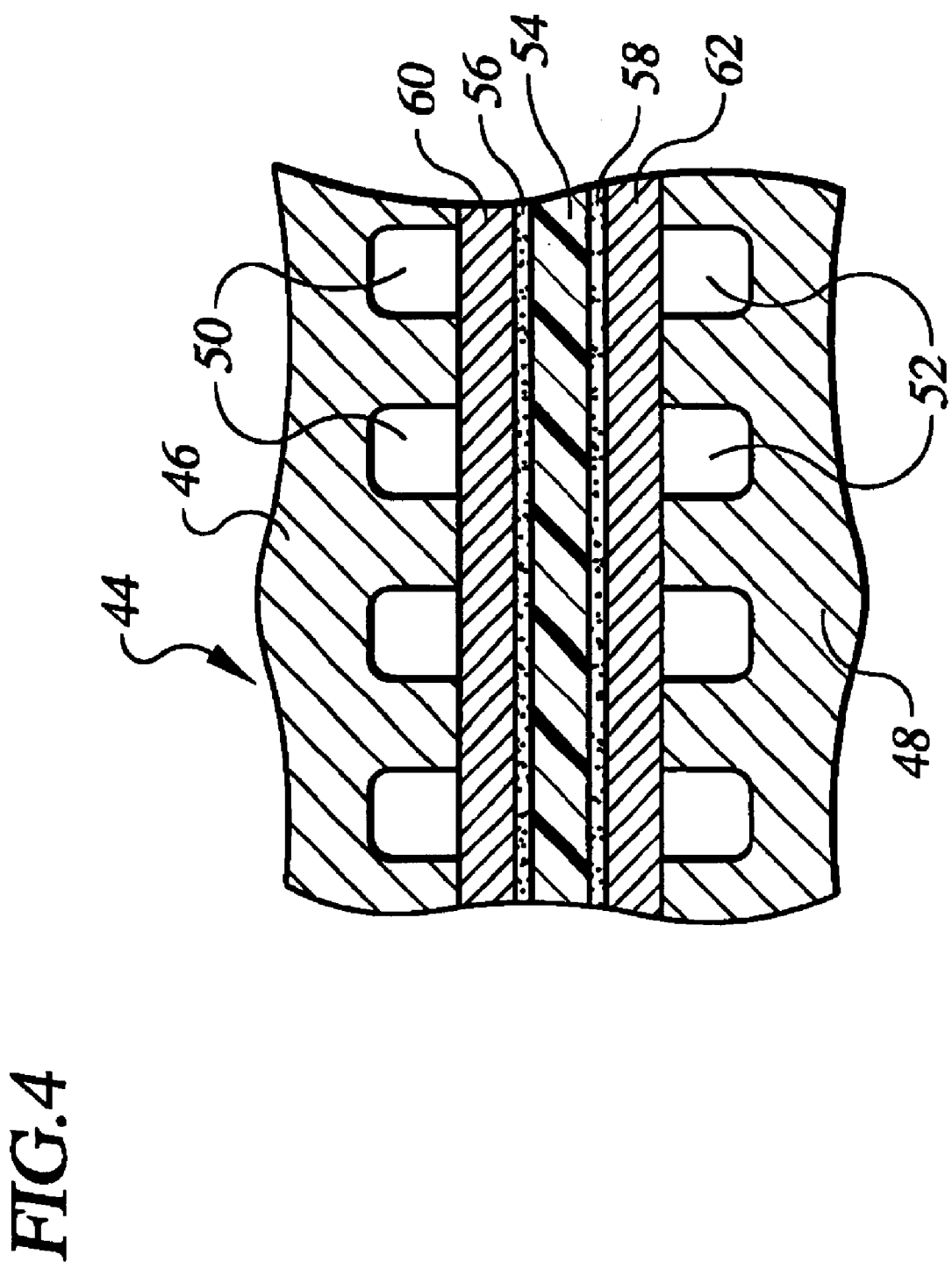
FIG. 4 is a partial cross sectional view of one example of a fuel cell in accordance with the present invention.

For purposes of illustration, FIG. 4 depicts a fuel cell 44 with fluid flow plates 46 and 48 serving as flow field plates. Fluid flow plates 46 and 48 may be of similar type and construction to fluid flow plate 30 described herein. In particular, fluid flow plate 46 might serve as an anode side of the fuel cell, and fluid flow plate 48 might serve as a cathode side of the fuel cell. That is, the face of fluid flow plate 46 might be an anode face, and the face of fluid flow plate 48 might be a cathode face. For instance, flow channel 50 of fluid flow plate 46 might carry hydrogen, as fuel, and humidification water. Further, a flow channel 52 of fluid flow plate 48 might carry air/oxygen, as oxidant, as well as humidification water and/or product water, as will be understood by those skilled in the art.

Fuel cell 44 includes a membrane or solid electrolyte 54. Preferably, solid electrolyte 54 is a solid polymer electrolyte made using a polymer such as a material manufactured by E. I. Du Pont de Nemours Company and sold under the trademark NAFION®. Further, an active electrolyte such as sulfonic acid groups might be included in this polymer. In another example, the solid polymer electrolyte might be formed with a product manufactured by W. L. Gore & Associates (Elkton, Md.) and sold under the trademark GORE-SELECT®. Moreover, catalysts 56 and 58 which facilitate chemical reactions, are applied to the anode and cathode sides, respectively, of solid electrolyte 54. Catalysts 56 and 58 may be constructed from platinum or other materials known in the art. This unit can be referred to as a "membrane electrode assembly" (hereinafter "MEA"). The MEA might be formed with a product manufactured by W. L. Gore & Associates and sold under the trade designation PRIMEA 5510-HS.

The MEA is sandwiched between anode and cathode gas diffusion layers (hereinafter "GDLs") 60 and 62, respectively, which can be formed with a resilient and conductive material such as carbon fabric or carbon fiber paper. In one embodiment of gas diffusion layers 60 and 62, porous carbon cloth or paper is infused with a slurry of carbon black and sintered with TEFLON® material.

The anode and cathode GDLs serve as electrochemical conductors between catalyzed sites of solid polymer electrolyte 54 and the fuel (e.g., hydrogen) and oxidant (e.g., air/oxygen) which each flow in anode and cathode flow channels 50 and 52, respectively. Further, the GDLs also present to the surfaces of the MEA a combination of microscopic porosity and macroscopic porosity. Microscopic porosity allows reactant gas molecules to pass generally longitudinally from the flow channel to a surface of the MEA. Macroscopic porosity allows product water formed at the cathode surface of the MEA to be removed therefrom by flowing generally longitudinally into the cathode flow channel, to prevent flooding of the catalyst particles.

Figure 5:
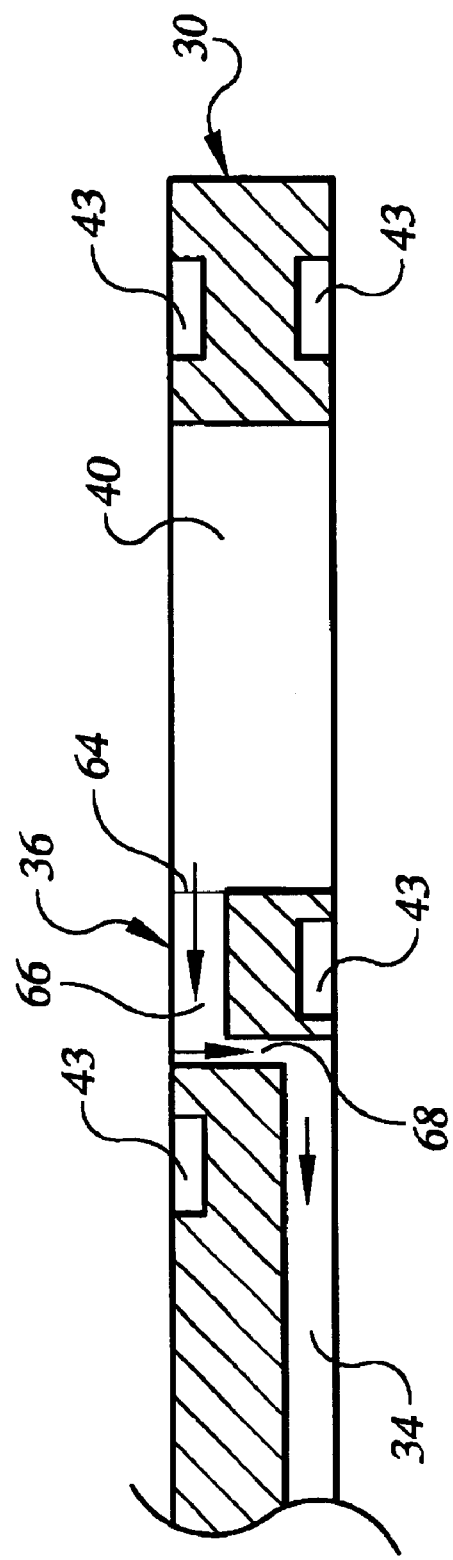
FIG. 5 is a cross sectional view of taken along lines 5—5 of FIGS. 2 and 3.

As illustrated in FIG. 5, fluid enters inlet 36, from fluid manifold 40 at opening 64. The reactant fluid passes through channel 66 and into dive through hole 68. Dive through hole(s) 68 extend through fluid flow plate 30 thereby allowing fluid from fluid flow manifold 40 to enter a flow channel 34, located on the opposite side of fluid flow plate 30. A sealing member, or gaskets may be employed within gasket groove(s) 43 to seal fluid manifold 40, thereby preventing leaking of fluid.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A fluid flow plate for a fuel cell, said fluid flow plate having a first face and a fluid manifold opening for receiving a fluid, said fluid flow plate further comprising:
   at least one flow channel defined within and extending along said first face for distributing a reactant in said fuel cell;
   at least one dive through hole defined in and extending through said fluid flow plate, said at least one dive through hole being fluidly connected to said fluid manifold opening by at least one inlet channel defined within an opposite face of said fluid flow plate, said at least one inlet channel extending from said fluid manifold opening along said opposite face of said fluid flow plate, said at least one dive through hole and said at least one inlet channel facilitating transmission of a portion of said fluid to said at least one flow channel; and
   a groove defined within at least one of said first face and said opposite face, said groove adapted to receive a sealing member.

2. A fluid flow plate as in claim 1, wherein said fuel cell is located in a fuel cell stack, said fuel cell stack comprising a plurality of fuel cells.

3. A fluid flow plate as in claim 1, wherein said groove is located within said first face between said fluid manifold opening and said at least one flow channel.

4. A fluid flow plate as in claim 1, wherein said sealing member comprises a gasket.

5. A fluid flow plate as in claim 1, wherein said groove is transverse to said at least one inlet channel.

6. A method for forming a fuel cell fluid flow plate assembly, comprising:
   providing a fluid flow plate having a first face and a second face and a fluid manifold opening for receiving a fluid, at least one flow channel defined in and extending along said first face for distributing a fluid in a fuel cell, and a first groove defined within said first face, said first groove adapted to receive a sealing member;
   providing at least one dive through hole defined in and extending through said fluid flow plate, said at least one dive through hole being fluidly connected to said fluid manifold opening by at least one inlet channel defined within said second face, said at least one inlet channel extending from said fluid manifold opening along said second face of said fluid flow plate, said at least one dive through hole and said at least one inlet channel facilitating transmission of a portion of said fluid to said at least one flow channel; and
   providing a second groove defined within said second face, said second groove adapted to receive a sealing member.

7. A fluid flow plate comprising:
   a first face, an opposite face, and a fluid manifold opening for receiving a fluid;
   at least one flow channel defined within and extending along said first face; and
   at least one dive through hole defined in and extending through said fluid flow plate, said at least one dive through hole being fluidly connected to said fluid manifold opening by at least one inlet channel defined within said opposite face of said fluid flow plate, said at least one inlet channel extending from said fluid manifold opening along said opposite face of said fluid flow plate, and said at least one dive through hole and said at least one inlet channel facilitating transmission of a portion of the fluid to said at least one flow channel.

8. A fuel cell assembly comprising at least one fluid flow plate of claim 7.

9. A method for forming a fluid flow plate, the method comprising;
   providing a fluid flow plate having a first face, an opposite face, and a fluid manifold opening for receiving a fluid;
   providing at least one flow channel defined within and extending along the first face; and
   providing at least one dive through hole defined in and extending through the fluid flow plate, the at least one dive through hole being fluidly connected to the fluid manifold opening by at least one inlet channel defined within the opposite face of the fluid flow plate, said at least one inlet channel extending from said fluid manifold opening along said opposite face of said fluid flow plate, and the at least one dive through hole and the at least one inlet channel facilitating transmission of a portion of the fluid to the at least one flow channel.

* * * * *